United States Patent
Dibacco et al.

[11] Patent Number: 5,844,201
[45] Date of Patent: Dec. 1, 1998

[54] WELDING TORCH APPARATUS

[76] Inventors: Pino Dibacco; John Iacobucci, both of 866 Main St East, Hamilton, ON, Canada, L8M 1L9

[21] Appl. No.: 785,789

[22] Filed: Jan. 21, 1997

[51] Int. Cl.$^6$ .................................................... B23K 9/73
[52] U.S. Cl. ................ 219/137.43; 219/136; 219/137.42
[58] Field of Search ................................ 219/137.43, 136, 219/137.42, 137.7, 137.9, 137 R

[56] References Cited

U.S. PATENT DOCUMENTS

| | | | |
|---|---|---|---|
| 3,196,249 | 7/1965 | Thostrup | 219/137.9 |
| 3,469,070 | 9/1969 | Bernard et al. | 219/137.7 |
| 4,109,131 | 8/1978 | Schlüter . | |
| 4,464,560 | 8/1984 | Church et al. | 219/137.42 |
| 4,609,804 | 9/1986 | Kishi et al. . | |
| 4,838,287 | 6/1989 | Matsui et al. . | |
| 4,854,549 | 8/1989 | Roberts et al. . | |
| 4,947,024 | 8/1990 | Anderson . | |
| 5,138,969 | 8/1992 | Thielmann . | |
| 5,278,392 | 1/1994 | Takacs | 219/137.43 |
| 5,603,854 | 2/1997 | Parry | 219/137.43 |

FOREIGN PATENT DOCUMENTS

| | | |
|---|---|---|
| 620048 | 5/1961 | Canada . |
| 636887 | 2/1962 | Canada . |
| 758239 | 5/1967 | Canada . |
| 1175113 | 9/1984 | Canada . |
| 1284522 | 8/1987 | Canada . |
| 1271229 | 7/1990 | Canada . |

*Primary Examiner*—Clifford C. Shaw

[57] ABSTRACT

A welding torch apparatus for use with conventional arc welding torches which have a gooseneck, a gas nozzle with an interior and a longitudinal axis, a first passageway for supplying of both a welding wire to a tip, and gas mixtures to a gas diffuser. The welding torch apparatus comprises a second passageway for selectively introducing into the interior of the gas nozzle, gas mixtures which by-pass the first passageway, so that contact is avoided between gas mixtures passing through the second passageway and gas mixtures and welding wire passing through the first passageway, until the gas mixtures and welding wire enter the interior of the gas nozzle, and wherein gas mixtures passing through the first passageway do not contain oil additions.

23 Claims, 8 Drawing Sheets

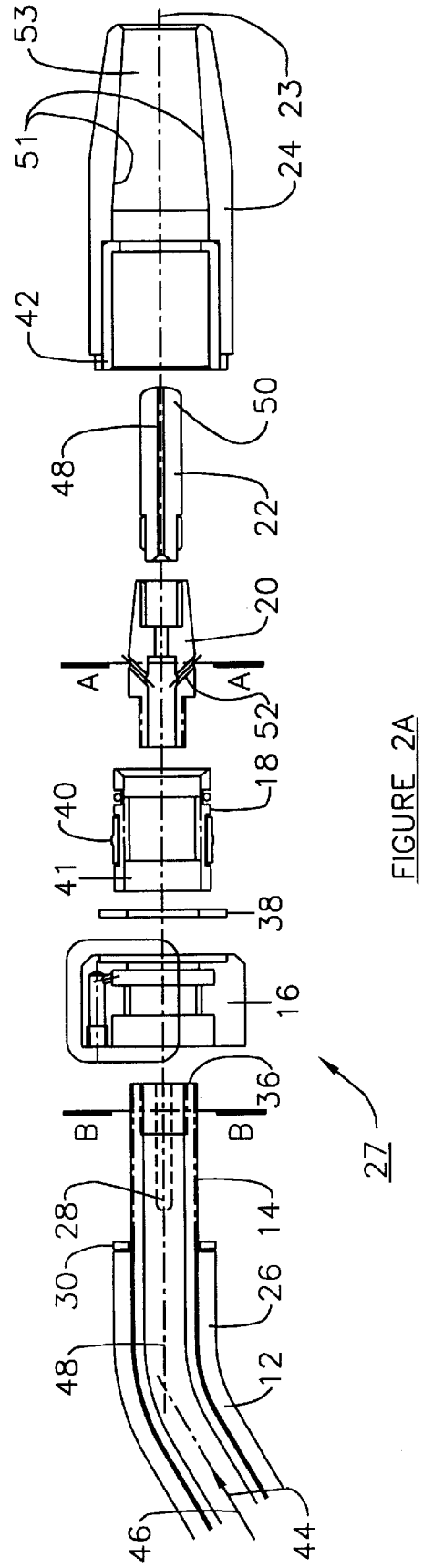

WELDING TORCH APPARATUS

FIELD OF THE INVENTION

This invention relates in general to arc welding equipment and more particularly to arc welding torch cleaning devices.

BACKGROUND OF THE INVENTION

Metal inert gas (MIG) and metal active gas (MAG) welding equipment introduces a welding wire and a shield gas through a passageway running through the welding torch. The welding wire and the shield gas share the same passageway. The welding wire exits at a tip at the gas nozzle whereas the shield gas exits via a gas diffuser inside the gas nozzle. During welding the shield gas exiting from the gas nozzle provides a shroud of gas around the welding pool area ensuring the integrity and quality of the weld.

The arc welding process creates weld material spatter at the welding tip which often adheres to the weld tip and/or the inside of the gas nozzle eventually clogging the torch and leading to a breakdown of weld integrity and quality. This problem has plagued the arc welding process since its inception and has become particularly acute in high production robotic welding operations where any down time is critical.

In order to overcome this clogging problem a number of methods and devices have been used or described to clean the welding tip and gas nozzle. One method is to mechanically remove the welding spatter that has accumulated on the welding tip and gas nozzle by abrading or brushing the surfaces affected. Another method is to periodically dip the gas nozzle with the welding tip into a container of oil coating the gas nozzle and welding tip surfaces in order to minimize the adhesion of the spatter on these parts of the welding torch.

Another method for preventing the build up of spatter on the gas nozzle and welding tip is described in U.S. Pat. No. 4,609,804 dated Sep. 2, 1986 by Kishi et al. entitled *Arc Welding Apparatus*, in which is described an automated means for introducing oil mist into the welding nozzle and tip area via the existing passageway and gas diffuser which transmit the shield gas and welding wire to the gas diffuser and welding torch tip respectively. This method of preventing spatter build up includes momentarily introducing pressurized air through the passageway and into the gas diffuser and then introducing pressurized air with an oil mist entrained through the passageway and into the gas diffuser to coat the welding tip and the interior of the gas nozzle. The oil mist is turned off, the shielding gas turned on and welding is continued.

The drawback with this method is that the welding wire is in intimate contact with the oil in the oil mist air mixture as it travels through the passageway. The oil mist which is introduced through the passageway can adhere to the welding wire and be dragged through to the welding tip and onto the work piece being welded. This can lead to welding imperfections and may also lead to blockage and gumming up of the passageway.

Accordingly there is a need for an apparatus and method which overcomes the above mentioned problems in existing devices and methods and provides an effective, automated means of keeping the welding torch and welding tip clean without sacrificing weld quality.

SUMMARY OF THE INVENTION

In accordance with one aspect of the invention: a welding torch apparatus for use with conventional arc welding torches having, a gas nozzle with an interior and a longitudinal axis, a first passageway for supplying of both a welding wire to a tip, and gas mixtures to a gas diffuser, the welding torch apparatus comprises a gas injection means for selectively introducing into the interior of the gas nozzle, gas mixtures which by-pass the first passageway, so that contact is avoided between gas mixtures passing through the gas injection means, and gas mixtures and welding wire passing through the first passageway, until the gas mixtures and welding wire enter the interior of the gas nozzle and wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire.

Preferably the gas injection means comprises a second passageway for selectively introducing into the interior of the gas nozzle gas mixtures through the second passageway which by-passes the first passageway, so that contact is avoided between the gas mixtures passing through the second passageway, and gas mixtures and welding wire passing through the first passageway, until the gas mixtures and welding wire enter the interior of the gas nozzle.

Preferably the gas injection means comprises a longitudinally extending mounting tube securely attached to a gooseneck. The mounting tube has longitudinal channels defined in an outer diameter for receiving gas mixtures and communicating gas mixtures to the interior of the gas nozzle. The welding torch apparatus additionally comprises an injector collar securely mounted on the outer diameter of the mounting tube, the injector collar having a gas receiving means for receiving gas mixtures and communicating gas mixtures to the mounting tube channels.

Preferably the gas diffuser comprises gas discharge apertures disposed at an acute angle less than 90 degrees relative to the longitudinal axis such that the flow of gas mixtures is directed toward the tip.

Preferably the gas discharge apertures are disposed at an acute angle between 60 and 30 degrees relative to the longitudinal axis such that the flow of gas mixtures is directed toward the tip.

Preferably the gas mixtures passing through the gas injection means are selected from the group comprising; air, air with an entrained oil mist, argon, argon with an entrained oil mist, nitrogen, nitrogen with an entrained oil mist, or a mixture thereof, and gas mixtures passing through the first passageway are selected from the group comprising; shield gases, air, nitrogen, argon or a mixture thereof.

In accordance with another aspect of the present invention: a welding torch cleaning apparatus for use with conventional arc welding equipment having a torch, a gooseneck, a nozzle, a first passageway for supplying of both a welding wire to a tip and gas mixtures to a gas diffuser. The welding torch cleaning apparatus comprises compressed gas sources containing gas mixtures. A gas injection means for selectively introducing into the gas nozzle gas mixtures which by-pass the first passageway, so that contact is avoided between the gas mixtures flowing through the gas injection means and gas mixtures and welding wire passing through the first passageway, until the gas mixtures and welding wire enter the interior of the gas nozzle, and wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire. It additionally comprises a gas distribution means for selectively communicating gas mixtures from gas sources to the gas injection means, and from gas sources to the first passageway, wherein torch cleaning is accomplished by supplying gas mixtures to the gas injection means and to the first passageway in a pre-selected cleaning cycle.

Preferably the gas distribution means comprises gas pipes connected to the gas sources and to the first passageway and the gas injection means. The gas pipes interposed by gas valves for controllably and selectively communicating gas mixtures from gas sources to the gas injection means and from gas sources to the first passageway.

Preferably the gas distribution means further comprises a control means for controlling the opening and closing of the gas valves according to the pre-selected cleaning cycle.

Preferably the control means further comprises a programable electronic controller for opening and closing the gas valves according to the pre-selected cleaning cycle.

In accordance with another aspect of the present invention: a method of operating an arc welder having an arc welding torch, a supply of gas mixtures including a supply of air with and without an entrained oil mist, a gooseneck, a gas nozzle, and a first passageway for supplying both a welding wire to a tip, and supplying gas mixtures to a gas diffuser. The method of operating an arc welder comprises the steps of:

a) Arc welding in a conventional manner with gas mixtures and welding wire supplied through the first passageway;

b) terminating arc welding;

c) c) supplying gas mixtures via a gas injection means, the gas injection means selectively introduces into the interior of the gas nozzle gas mixtures which by-pass the first passageway, so that contact is avoided between gas mixtures passing through the gas injection means, and gas mixtures and welding wire passing through the first passageway, until the gas mixtures and welding wire enter the interior of the gas nozzle and wherein only gas mixtures passing through the gas injection means include oil additions thereby coating with oil an interior surface of said gas nozzle as well as said gas diffuser and tip thereby minimizing weld spatter, buildup on said interior surface, gas diffuser and tip.

d) terminating supply of air with an entrained oil mist; and e) repeating steps (a) to (e).

Preferably the method of operating an arc welder is modified wherein step (c), is substituted with the following step:

c) simultaneously supplying gas mixtures through the first passageway and supplying gas mixtures via a gas injection means, the gas injection means selectively introduces into the interior of the gas nozzle gas mixtures which by-pass the first passageway, so that contact is avoided between gas mixtures passing through the gas injection means, and gas mixtures and welding wire passing through the first passageway, until the gas mixtures and welding wire enter the interior of the gas nozzle and wherein only gas mixtures passing through the gas injection means contain oil additions.

Preferably the method of operating an arc welder has the following additional steps prior to step (e):

d') supplying compressed air via the first passageway in order to expel excess oil and spatter on gas diffuser, tip and interior surface of said gas nozzle;

d") terminating supply of compressed air.

In accordance with another aspect of the present invention: a gas diffuser for use with conventional arc welding torches having, a gas nozzle with a longitudinal axis, a first passageway for supplying of both a welding wire to a tip, and gas mixtures through the gas diffuser. The gas diffuser comprises gas discharge apertures disposed at an acute angle less than 90 degrees relative to the longitudinal axis such that the flow of gas mixtures is directed toward the tip.

BRIEF DESCRIPTION OF THE DRAWINGS

The invention will now be described by way of example only, with references to the following drawings in which:

FIG. 2A is an exploded schematic side cross sectional view of the welding torch apparatus.

FIG. 2B is a schematic transverse cross sectional view taken through A—A of FIG. 2A.

FIG. 2C is a schematic transverse cross sectional view taken through B—B of FIG. 2A.

FIG. 3A is a schematic side cross sectional view of the portion circled in FIG. 2A.

FIG. 3B is a schematic transverse cross sectional view of the detail shown in FIG. 3A.

DETAILED DESCRIPTION OF THE PREFERRED EMBODIMENT

Figure 1:
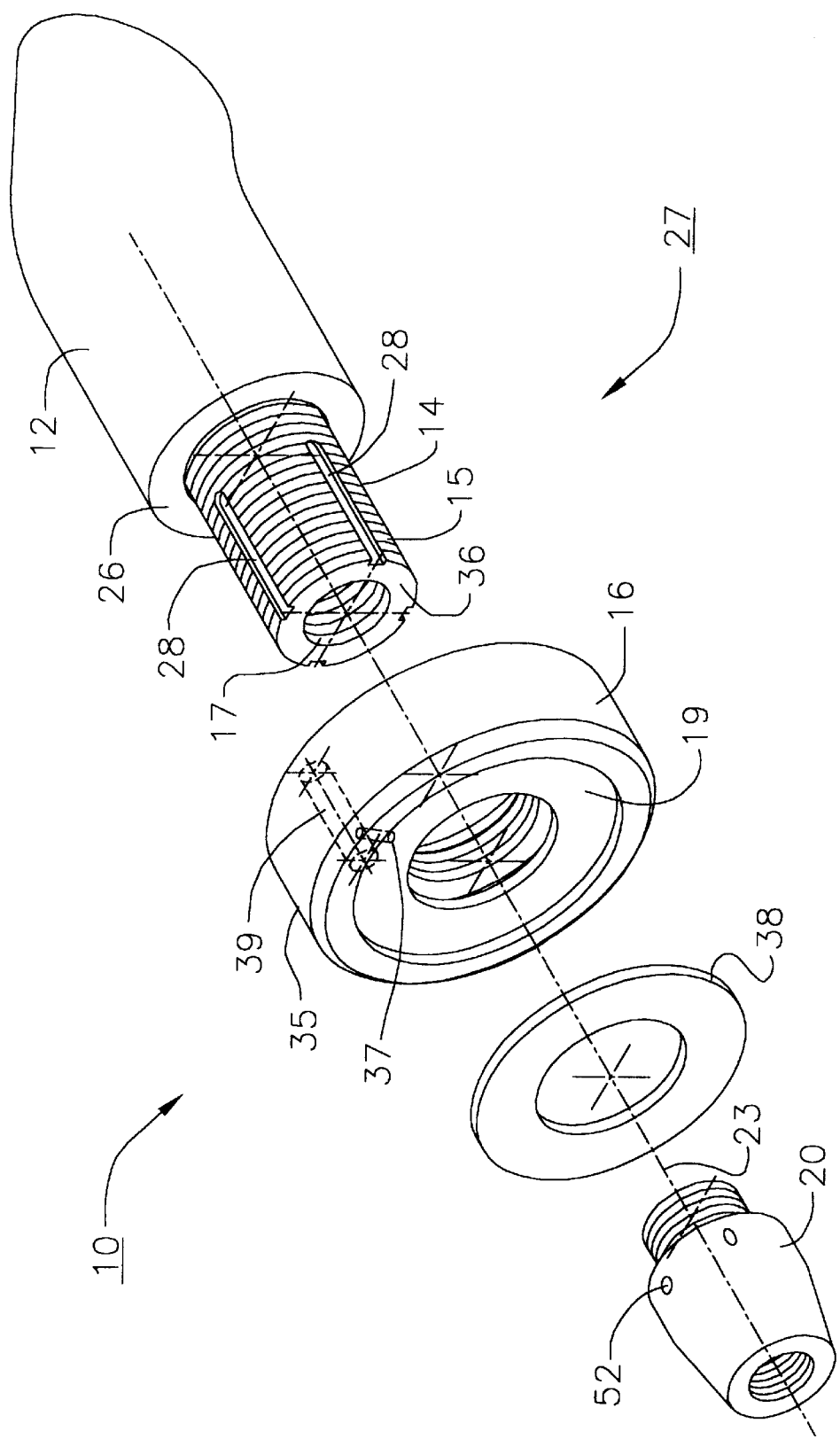
FIG. 1 is a schematic perspective exploded view of the welding torch apparatus particularly showing the gas injection means.

Referring to FIGS. 1, 2A, 2B, 2C and 3A and 3B, a preferred embodiment of the present invention, a welding torch apparatus shown generally a 10, comprises gooseneck 12, mounting tube 14, injector collar 16, collet 18, gas diffuser 20, tip 22, and gas nozzle 24.

Mounting tube 14 extends longitudinally from gooseneck tip 26 and has four longitudinal channels 28 running part way along the outer diameter 15 of mounting tube 14. Outer diameter 15 and inner diameter 17 of mounting tube 14 is threaded for threadably mounting of components thereon. Injector collar 16 is threadably mounted onto outer diameter 15 of mounting tube 14 making contact with first insulator ring 30. Second insulator ring 38 makes surface contact with a front surface 19 of injector collar 16. Collet 18 is threadably mounted onto outer diameter 15 of mounting tube 14 until collet 18 makes contact with second insulator ring 38. Gas diffuser 20 is threaded into inner diameter 17 of mounting tube 14 until gas diffuser 20 makes contact with tube end 36. Tip 22 is threaded into gas diffuser 20. Gas nozzle 24 fits over nozzle insulator 42 and nozzle insulator 42 then fits interferingly over the outer diameter of collet ring 40. These components are known in the art except for: injector collar 16, modifications made to mounting tube 14; namely the addition of longitudinal channels 28, and optionally modifications to gas diffuser 20 described below.

Figure 4:
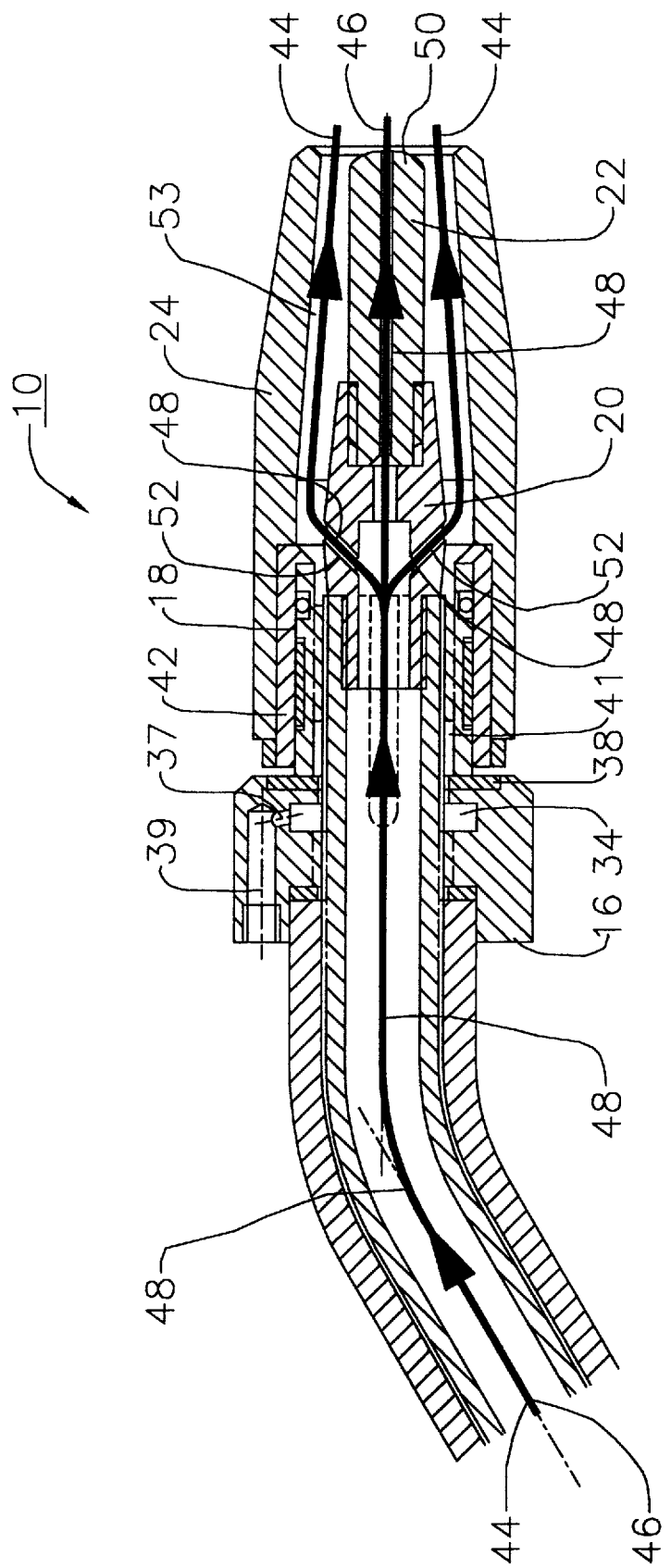
FIG. 4 is a schematic side cross sectional view of the assembled welding torch apparatus showing the path of the welding wire and the shield gas through the first passageway.

Referring now to FIG. 4 as well, which shows first passageway 48 shown in thick lines which is the pathway taken by welding wire 46 and shield gas 44 through the welding torch apparatus 10. A shield gas is a gas used during the welding operation to protect the molten weld pool from exposure to air thereby ensuring good weld quality. Gas mixtures can be a shield gas, a single gas, two or more gases, or a gas with an oil addition such as oil in the form of an oil mist entrained in a gas, or any combination of the foregoing. Welding wire 46 is supplied through first passageway 48 and exits at tip end 50. Shield gas 44 is also introduced through first passageway 48 exiting through gas discharge apertures 52 located in gas diffuser 20. It will be recognized by those skilled in the art that this is the conventional pathway taken by shield gas 44 and welding wire 46. This configuration or variations thereof is found in most conventional MIG or MAG welding torches. It will be further appreciated that collar 16, and longitudinal channels 28 are new or modified components of a conventional torch and that optionally, gas diffuser 20 is also modified as described below for optimum performance.

Figure 5:
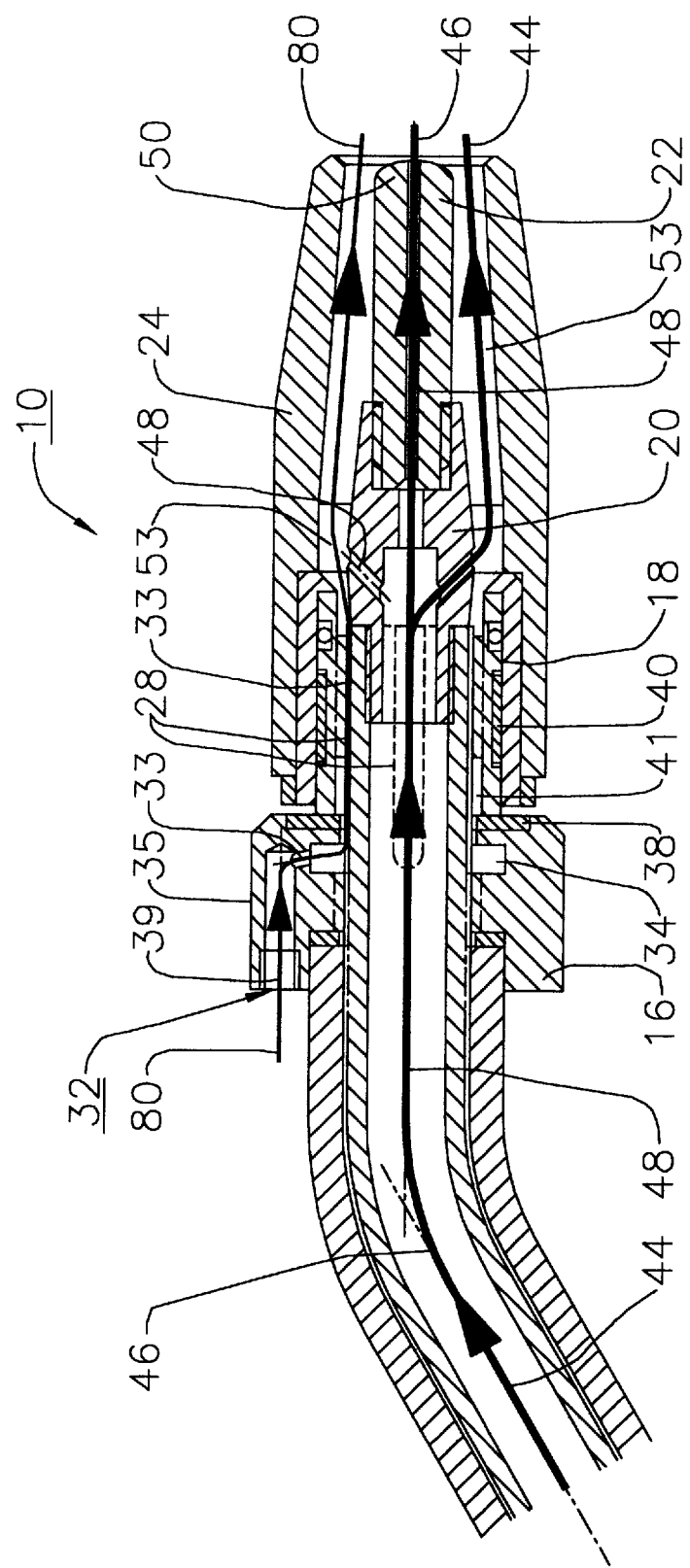
FIG. 5 is a schematic side cross sectional view of the assembled welding torch apparatus showing the path of the welding wire and the shield gas through the first passageway and the oil mist through the second passageway.

Referring now to FIG. 5 as well, gas injection means shown generally as 27 preferably comprises collar 16 having injector gas inlet shown generally as 32 and annular collar plenum 34. Injector gas inlet 32 is connected to and communicating with annular collar plenum 34 which is connected to and communicating with longitudinal channels 28. Longitudinal channels 28 extend to tube end 36. Collar 16 together with longitudinal channels 28 create a second passageway 33 for gas mixtures to be supplied into the interior 53 of gas nozzle 24. Injector gas inlet 32 comprises a hole 39 bored proximate outer diameter 35 of collar 16 and a connecting bore 37 connecting hole 39 with collar plenum 34. Collar plenum 34 distributes gas mixtures to longitudinal channels 28 thereby evenly distributing gas mixtures supplied through second passageway 33 around the inner surface 51 of gas nozzle 24. An incoming pipe (not shown) is threadably connected to hole 39 for supplying gas mixtures to gas inlet 32. It will be recognized by those skilled in the art that first passageway 48 and second passageway 33 are independent and separate passageways which provide the supply of gas mixtures to the interior 53 of gas nozzle 24. The gas mixtures passing through the first and second passageway do not contact each other until released into the interior 53 of gas nozzle 24.

Optionally, the following additional modifications can be made. Gas discharge apertures 52 in gas diffuser 20 are normally disposed perpendicular to longitudinal axis 23. In order to optimize the performance of welding torch apparatus 10, gas discharge apertures 52 are bored optimally at a 45 degree angle as depicted or at an acute angle between 30 and 60 degrees relative longitudinal axis 23 thereby aiding the flow of gas mixtures through and out of the interior 53 of gas nozzle 24. Additionally to enhance the flow of gas mixtures through second passageway 33, an annular relief 41 is machined in collet 18 in order to assist in the even distribution of gas mixtures to all of the longitudinal channels 28.

Figure 6:
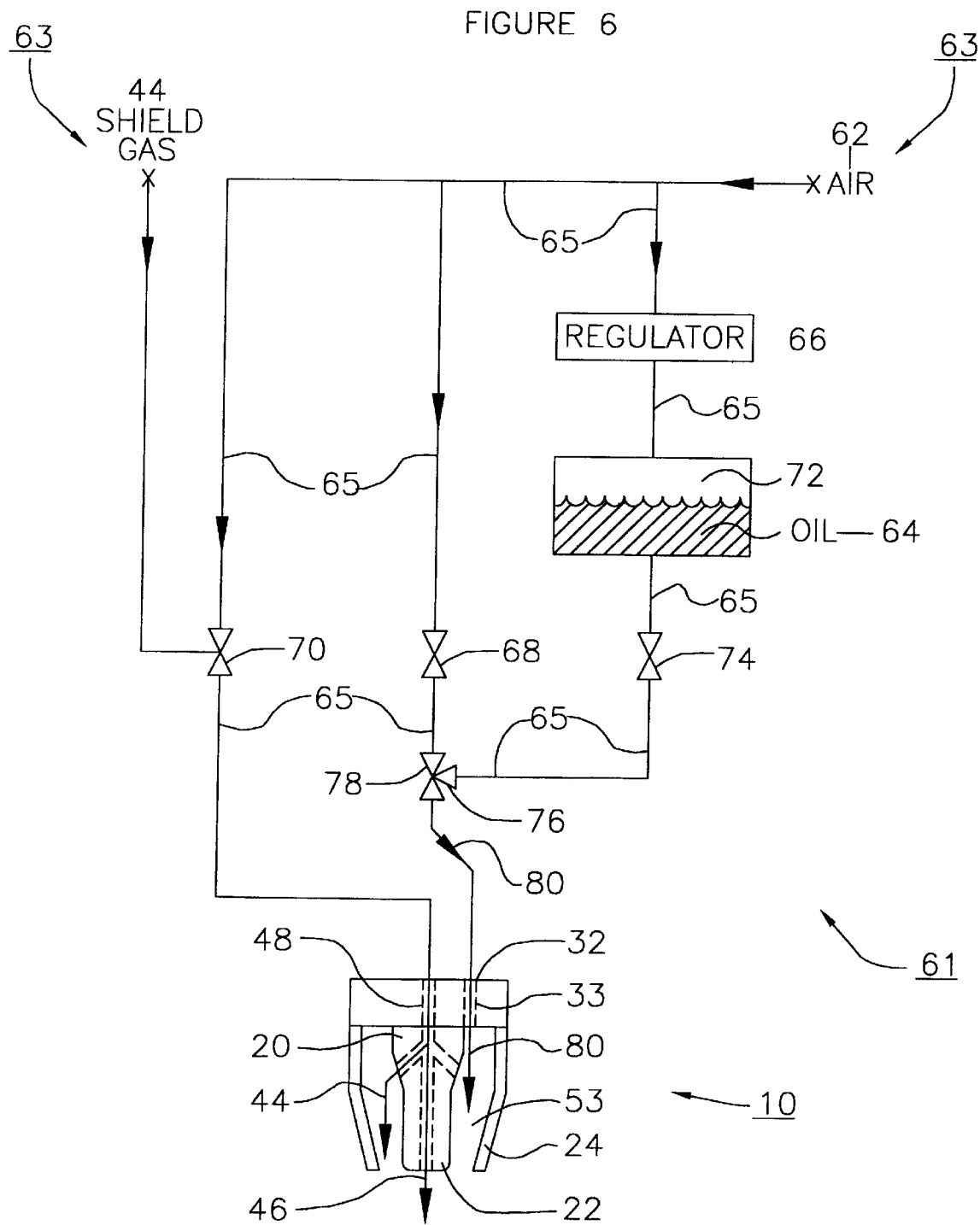
FIG. 6 is a schematic piping diagram of gas distribution means showing the piping and valving for supply of shield gas and gas mixtures to the welding torch apparatus.

Referring now to FIG. 6, a schematic diagram of gas distribution means shown generally as 61 showing gas sources generally as 63, and gas pipes 65, the gas distribution means 61 comprises supplying air 62, shield gas 44, and oil 64 to welding torch apparatus 10 in a pre-selected manner. Air 62 is supplied to solenoid valves 68, 70 and to pressure regulator 66. Pressurized oil reservoir 72 contains oil 64 which is supplied to solenoid valve 74 and check valve 76. Air 62 is mixed with oil 64 in needle valve 78 creating an air with oil mist gas mixture (hereinafter referred to as oil mist 80) which is selectively supplied to gas inlet 32. Shield gas 44 and air 62 can selectively be supplied to first passageway 48 or shut off completely. Gas sources 63 may also be any other gases known by persons skilled in the welding industry and therefore Oil mist 80 may also be any gas known by persons skilled in the welding industry entrained or mixed with an oil mist.

In use, MIG or MAG welding with welding torch apparatus 10 is carried out in the conventional manner, briefly described as follows. Welding wire 46 is continuously supplied through first passageway 48 until exiting at tip 50. Simultaneously shield gas 44 is introduced through first passageway 48 exiting through gas discharge apertures 52 in gas diffuser 20 creating a gas shroud within the interior 53 of gas nozzle 24 and also over the welding puddle (not shown) thereby protecting and shrouding the weld puddle during welding. This is the conventional manner in which MIG or MAG welding is carried out.

Figure 7:
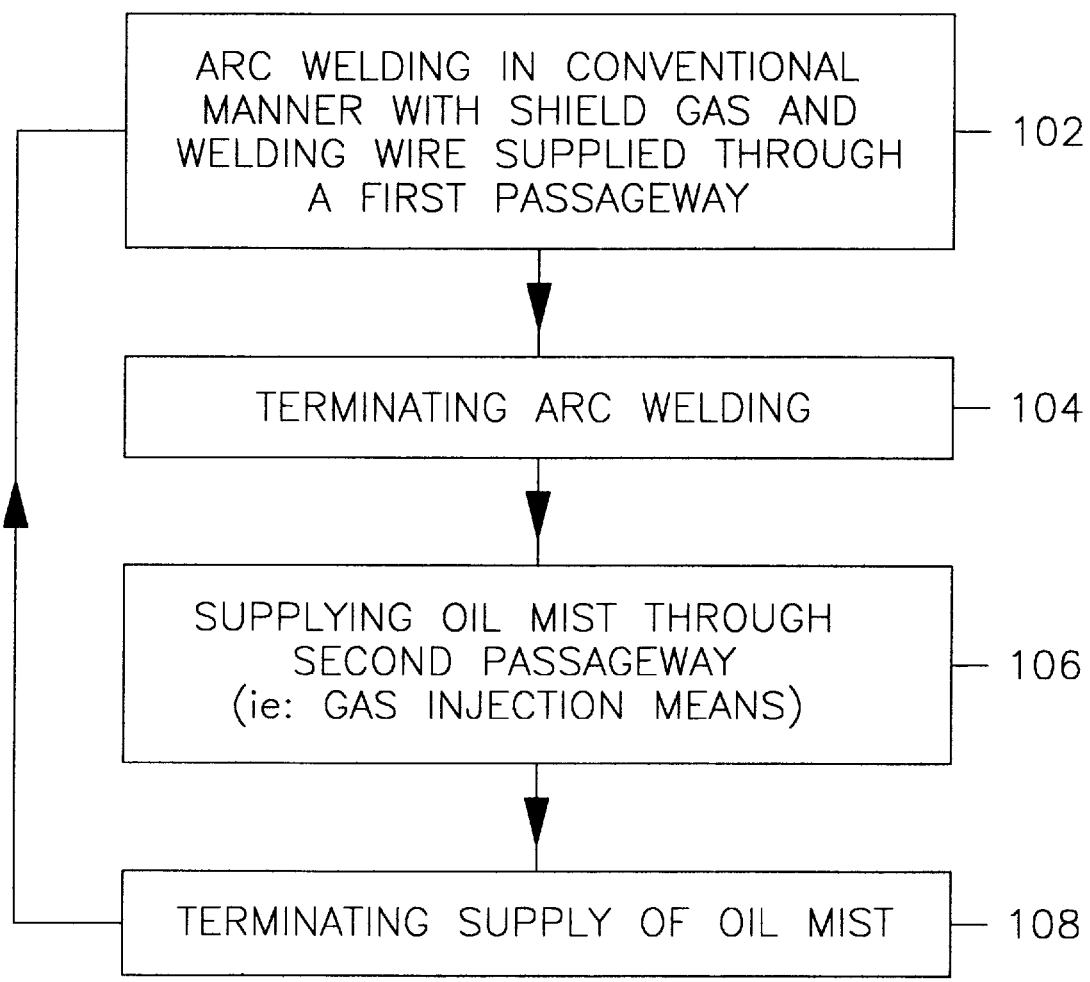
FIG. 7 is a flow diagram showing a preferred method of use of the welding torch cleaning apparatus.

Referring now to FIG. 7, following steps 102 to 108 is the preferred method of carrying out a pre-selected cleaning cycle. Firstly step 102, arc welding is carried out in the conventional manner as described above. Secondly step 104, arc welding is paused or terminated for a short period of time. During this pause feeding of weld wire 46 through first passageway 48 is halted and optionally shield gas 44 is turned off. Welding torch apparatus 10 is then positioned away from the workpiece that is being welded. In third step 106, oil mist 80 is introduced into gas injection means 27 and flows through second passageway 33. This expels any built up spatter on tip 22, gas diffuser 20 and interior surface 51 of gas nozzle 24 and simultaneously coats tip 22, gas diffuser 20 and the interior surface 51 of gas nozzle 24 with oil contained in oil mist 80. Finally, in step 108 oil mist 80 is turned off and optionally shield gas 44 is turned on. The welding torch is repositioned over the work piece and welding wire 46 is fed through first passageway 48 and conventional arc welding resumes.

Figure 8:
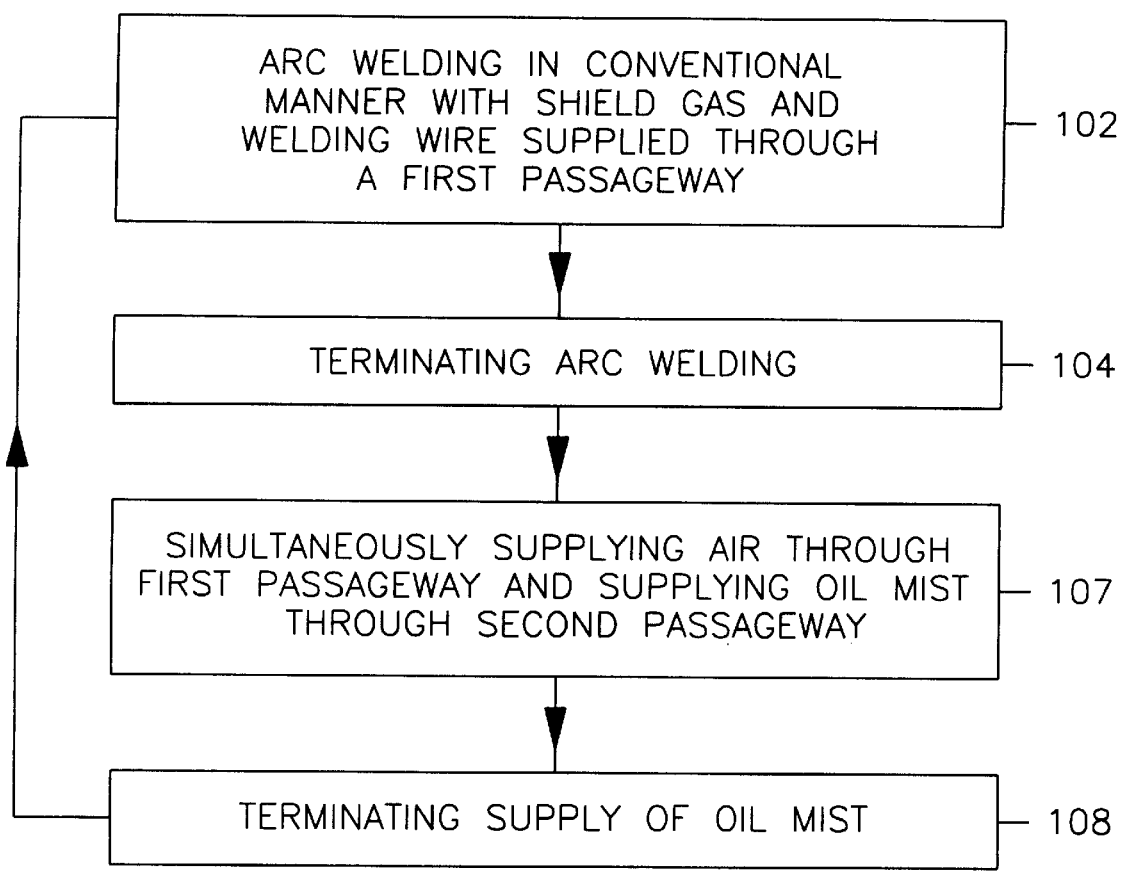
FIG. 8 is a flow diagram showing another preferred method of use of the welding torch cleaning apparatus.

Referring now to FIG. 8, third step 106 in FIG. 7 is replaced by step 107 wherein, oil mist 80 is introduced via gas injection means 27 and flows through second passageway 33. This expels any built up spatter on tip 22, gas diffuser 20 and interior surface 51 of gas nozzle 24 and simultaneously coats tip 22, gas diffuser 20 and the interior surface 51 of gas nozzle 24 with oil contained in oil mist 80. Simultaneously air is supplied through first passageway 48 aiding the removal and expulsion of spatter. Steps 102, 104 and 108 are identical to those above.

Figure 9:
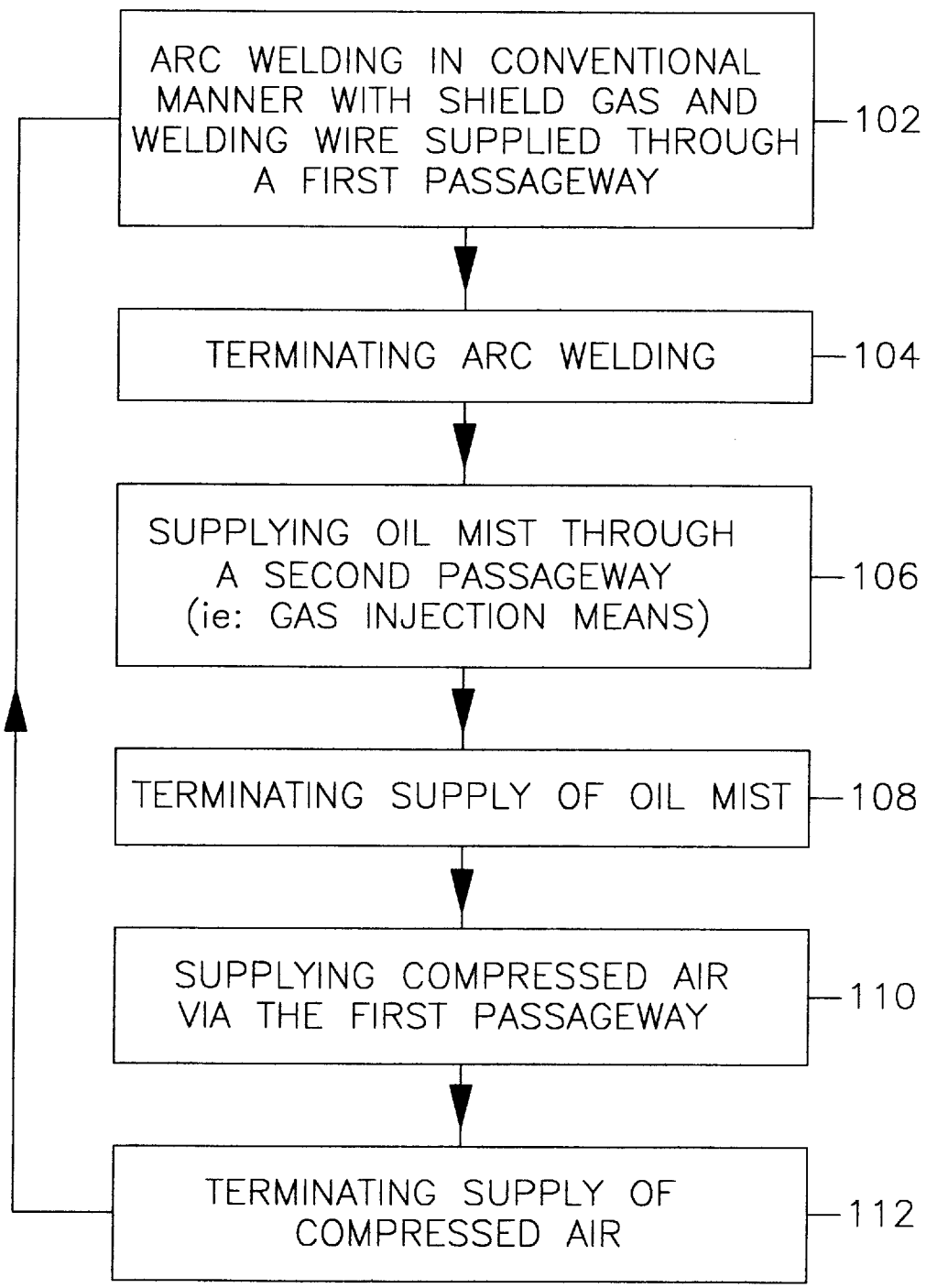
FIG. 9 is a flow diagram showing yet another preferred method of use of the welding torch cleaning apparatus

Referring now to FIG. 9, preferably the pre-selected cleaning cycle comprises the additional steps following step 108 to those described in FIG. 7, of steps 110 and 112. In step 110, compressed air is introduced through first passageway 48 and exits at gas discharge apertures 52 thereby eliminating any excess oil and/or spatter still remaining on gas diffuser 20, tip 22, and interior surface 51 of gas nozzle 24. Step 112, compressed air flowing through first passageway 48 is then turned off and welding torch apparatus 10 is moved into position over the workpiece to be welded and the feeding of weld wire 46 through first passageway 48 is once again initiated and optionally shield gas 44 is turned on providing it had been shut off earlier and arc welding continues in the conventional manner.

Oil mist 80 enters gas nozzle 24 through second passageway 33 which avoids contact with weld wire 46 which it is fed through first passageway 48. Additionally supplying compressed air 62 through first passageway 48 (either simultaneously or sequentially) ensures that any excess oil is removed from gas diffuser 20, tip 22, and interior surface 51 of gas nozzle 24. Gas diffuser 20 having gas discharge apertures 52 angled at approximately 45 relative to the longitudinal axis 23 also helps the cleaning and removal of excess oil from within gas nozzle 24. The possibility of excess oil entering the weld puddle is minimized thereby providing for a high quality weld.

It will be apparent to persons skilled in the art that any commercially available welding torch can be modified in a similar manner as described in the preferred embodiments. There are many different ways of providing two independent and separate passageways into the interior 53 of nozzle 24. The exact physical structure can be varied without departing from the spirit of this invention. It is also possible to use a variety of different gas mixtures. For example the gas mixture may be an inert gas with an oil addition or any variety of welding or other gas mixtures that are commercially available. Oil 64 in this specification is defined as any substance which when applied to the surface of gas nozzle 24 prevents weld spatter buildup. The oil 64 must be capable of being transported to nozzle 24 in a carrier gas; such as nitrogen or air, and preferably be transported in the form of an oil mist 80. Preferably oil 64 is common petroleum oil, mineral oil, vegetable oil and the like. However it may be any spatter retardent material. The composition of the oil is not critical and many commercially available oils can be effectively used as for example motor oil 10W30. The viscosity of the oil is such to enable an oil mist to be mixed with a gas which is known to persons skilled in the art.

It will be apparent to persons skilled in the art, various modifications and adaptations of the structure described above are possible without departure from the spirit of the invention, the scope of which is defined in the appended claims.

I claim:

1. A welding torch apparatus for use with conventional arc welding torches having a gas nozzle with an interior and a longitudinal axis, a first passageway for supplying of both a welding wire to a tip, and gas mixtures to a gas diffuser, the welding torch apparatus comprising:
   a) a gas injection means for selectively introducing into the interior of the gas nozzle, gas mixtures which by-pass the first passageway, so that contact is avoided between gas mixtures passing through the gas injection means and gas mixtures and welding wire passing through the first passageway until the gas mixtures and welding wire enter the interior of the gas nozzle, wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire.

2. The welding torch apparatus claimed in claim 1, wherein the gas injection means comprises a second passageway for selectively introducing into the interior of the gas nozzle gas mixtures through the second passageway which by-passes the first passageway.

3. The welding torch apparatus claimed in claim 1, wherein gas mixtures passing through the first passageway are shield gases.

4. The welding torch apparatus claimed in claim 1, wherein the gas mixtures passing through the gas injection means include air.

5. The welding torch apparatus claimed in claim 1, wherein the gas injection means comprises:
   a) a longitudinally extending mounting tube being securely attached to a gooseneck, the mounting tube having longitudinal channels defined in an outer diameter for receiving gas mixtures and communicating gas mixtures to the interior of the gas nozzle and communicating gas mixtures from an injector collar; and
   b) said injector collar securely mounted on the outer diameter of the mounting tube, the injector collar having a gas receiving means for receiving gas mixtures and communicating gas mixtures to the mounting tube channels.

6. The welding torch apparatus claimed in claim 5, wherein the gas diffuser comprises gas discharge apertures disposed at an acute angle less than 90 degrees relative to the longitudinal axis such that the flow of gas mixtures is directed toward the tip.

7. The welding torch apparatus claimed in claim 6, wherein the gas discharge apertures are disposed at an acute angle preferably between 60 and 30 degrees relative to the longitudinal axis such that the flow of gas mixtures is directed toward the tip.

8. The welding torch apparatus claimed in claim 1, wherein the gas mixtures passing through the gas injection means are selected from the group comprising; air, air with an entrained oil mist, argon, argon with an entrained oil mist, nitrogen, nitrogen with an entrained oil mist, or a mixture thereof, and gas mixtures passing through the first passageway are selected from the group comprising; shield gases, air, nitrogen, argon or a mixture thereof.

9. A welding torch cleaning apparatus for use with conventional arc welding equipment having a gas nozzle with an interior and a longitudinal axis, a first passageway for supplying of both a welding wire to a tip and gas mixtures to a gas diffuser, the welding torch cleaning apparatus comprising:
   a) compressed gas sources containing gas mixtures;
   b) a gas injection means for selectively introducing into the interior of the gas nozzle gas mixtures which by-pass the first passageway, so that contact is avoided between gas mixtures passing through the gas injection means and gas mixtures and welding wire passing through the first passageway until the gas mixtures and welding wire enter the interior of the gas nozzle, wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire; and
   c) a gas distribution means for selectively communicating gas mixtures from gas sources to the gas injection means, and from gas sources to the first passageway, wherein torch cleaning is accomplished by supplying gas mixtures to the gas injection means and to the first passageway in a pre-selected cleaning cycle.

10. The welding torch apparatus claimed in claim 9, wherein the gas injection means comprises:
   a) a longitudinally extending mounting tube being securely attached to a gooseneck, the mounting tube having longitudinal channels defined in an outer diameter for receiving gas mixtures and communicating gas mixtures to the interior of the gas nozzle and communicating gas mixtures from an injector collar; and b) said injector collar securely mounted on the outer diameter of the mounting tube, the injector collar having a gas receiving means for receiving gas mixtures and communicating gas mixtures to the mounting tube channels.

11. The welding torch cleaning apparatus claimed in claim 9, wherein the gas diffuser comprises gas discharge apertures disposed at an acute angle less than 90 degrees relative to the longitudinal axis such that the flow of gas mixtures is directed toward the tip.

12. The welding torch cleaning apparatus claimed in claim 11, wherein the gas discharge apertures are disposed at an acute angle preferably between 60 and 30 degrees relative to the longitudinal axis such that the flow of gas mixtures is directed toward the tip.

13. The welding torch cleaning apparatus claimed in claim 9, wherein the gas distribution means comprises gas pipes connecting the gas sources to the first passageway and to the gas injection means, the gas pipes interposed by gas valves for controllably and selectively communicating gas mixtures from gas sources to the gas injection means and from gas sources to the first passageway.

14. The welding torch cleaning apparatus claimed in claim 13, wherein the gas distribution means further comprises a control means for controlling the opening and closing of the gas valves according to the pre-selected cleaning cycle.

15. The welding torch cleaning apparatus claimed in claim 14, wherein the control means further comprises a programable electronic controller for opening and closing the gas valves according to the pre-selected cleaning cycle.

16. A method of operating an arc welder having a supply of gas mixtures including a supply of air with and without an entrained oil mist, a gas nozzle with an interior and a longitudinal axis, and a first passageway for supplying both a welding wire to a tip and supplying gas mixtures to a gas diffuser, the method of operating an arc welder comprising the steps of:

a) Arc welding in a conventional manner with gas mixtures and welding wire supplied through the first passageway;

b) terminating arc welding;

c) supplying gas mixtures via a gas injection means, the gas injection means for selectively introducing into the interior of the gas nozzle gas mixtures which by-pass the first passageway, so that contact is avoided between gas mixtures passing through the gas injection means and gas mixtures and welding wire passing through the first passageway until the gas mixtures and welding wire enter the interior of the gas nozzle, and wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire;

d) terminating supply of air with an entrained oil mist via the gas injection means; and e) repeating steps (a) to (e).

17. The method of claim 16, wherein step (c), is substituted with the following step:

c) simultaneously supplying gas mixtures through the first passageway and supplying gas mixtures through a gas injection means, the gas injection means selectively introduces into the interior of the gas nozzle gas mixtures which by-pass the first passageway, so that contact is avoided between gas mixtures passing through the gas injection means, and gas mixtures and welding wire passing through the first passageway, until the gas mixtures and welding wire enter the interior of the gas nozzle and wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire.

18. The method of claim 16, wherein prior to step (e), the following additional steps are included:

d') supplying compressed air through the first passageway in order to expel excess oil and spatter on gas diffuser, tip and interior surface of said gas nozzle, d") terminating supply of compressed air.

19. The method of claim 16 wherein the gas injection means comprises:

a) a mounting tube being securely attached to a gooseneck, the mounting tube having longitudinal channels defined in an outer diameter for receiving gas mixtures and communicating gas mixtures to the interior of the gas nozzle and communicating gas mixtures from an injector collar; and b) said injector collar securely mounted on the outer diameter of the mounting tube having a gas receiving means for receiving gas mixtures and communicating gas mixtures to the mounting tube channels.

20. The method claimed in claim 16, wherein the gas diffuser comprises gas discharge apertures disposed at an acute angle less than 90 degrees relative to the longitudinal axis such that the flow of gas mixtures is directed toward the tip.

21. The method of operating an arc welder claimed in claim 16, wherein the gas mixtures passing through the gas injection means are selected from the group comprising; air, air with an entrained oil mist, argon, argon with an entrained oil mist, nitrogen, nitrogen with an entrained oil mist, or a mixture thereof, and gas mixtures passing through the first passageway are selected from the group comprising; shield gases, air, nitrogen, argon or a mixture thereof.

22. The method of claim 16 wherein the gas injection means comprises:

a) means for selectively introducing into the interior of the gas nozzle, gas mixtures which by-pass the first passageway, so that contact is avoided between gas mixtures passing through the gas injection means and gas mixtures and welding wire passing through the first passageway until the gas mixtures and welding wire enter the interior of the gas nozzle, wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire;

b) wherein the gas injection means comprises a longitudinally extending mounting tube being securely attached to a gooseneck, the mounting tube having longitudinal channels defined in an outer diameter for receiving gas mixtures and communicating gas mixtures to the interior of the gas nozzle and communicating gas mixtures from an injector collar and said injector collar securely mounted on the outer diameter of the mounting tube, the injector collar having a gas receiving means for receiving gas mixtures and communicating gas mixtures to the mounting tube channels;

c) wherein the gas diffuser comprises gas discharge apertures disposed at an acute angle less than 90 degrees and preferably between 30 and 60 degrees relative to the longitudinal axis such that the flow of gas mixtures is directed toward the tip.

23. A welding torch apparatus for use with conventional arc welding torches having a gas nozzle with an interior and a longitudinal axis, a first passageway for supplying of both a welding wire to a tip, and gas mixtures to a gas diffuser, the welding torch apparatus comprising:

a) a gas injection means for selectively introducing into the interior of the gas nozzle, gas mixtures which by-pass the first passageway, so that contact is avoided between gas mixtures passing through the gas injection means and gas mixtures and welding wire passing through the first passageway until the gas mixtures and welding wire enter the interior of the gas nozzle, wherein only gas mixtures passing through the gas injection means include oil additions for coating with oil an interior surface of said gas nozzle as well as said gas diffuser and tip thereby minimizing weld spatter buildup on said interior surface, gas diffuser, tip, and also minimizing oil contamination of said weld wire;

b) wherein the gas injection means comprises a longitudinally extending mounting tube being securely attached to a gooseneck, the mounting tube having longitudinal channels defined in an outer diameter for receiving gas mixtures and communicating gas mixtures to the interior of the gas nozzle and communicating gas mixtures from an injector collar, and said injector collar securely mounted on the outer diameter of the mounting tube, the injector collar having a gas receiving means for receiving gas mixtures and communicating gas mixtures to the mounting tube channels;

c) wherein the gas diffuser comprises gas discharge apertures disposed at an acute angle less than 90 degrees and preferably between 30 and 60 degrees relative to the longitudinal axis such that the flow of gas mixtures is directed toward the tip.

* * * * *